Aug. 5, 1952     G. A. COLLENDER     2,606,036
MOUNTING FOR WHEEL BRAKE OPERATING MECHANISM
Original Filed Nov. 1, 1945
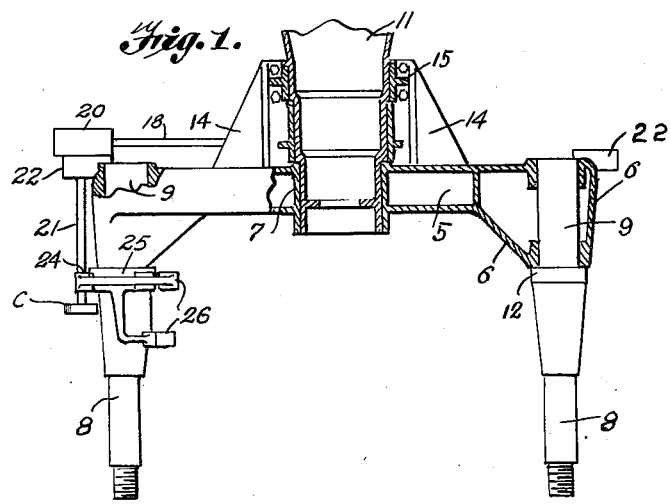
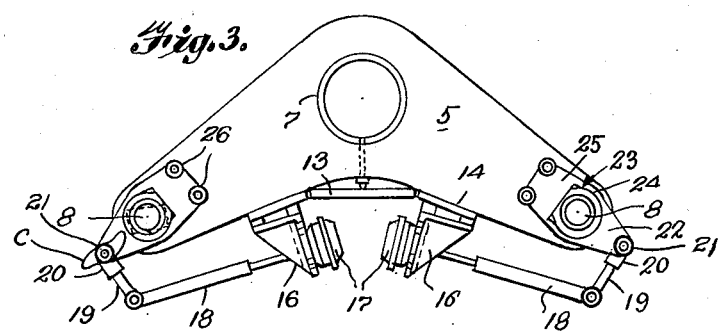
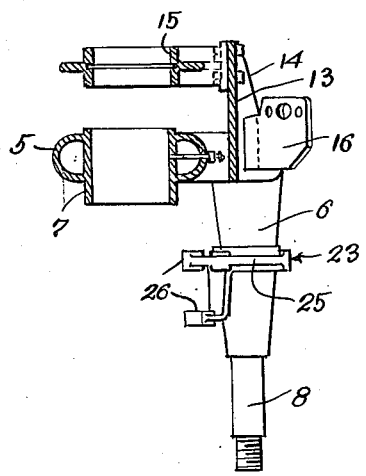
INVENTOR.
GUSTAVE A. COLLENDER
BY Ralph L. Stevens
ATTORNEY Patented Aug. 5, 1952

2,606,036

UNITED STATES PATENT OFFICE 2,606,036

MOUNTING FOR WHEEL BRAKE OPERATING MECHANISM

Gustave A. Collender, Los Angeles, Calif., assignor to Six Wheels, Inc., Los Angeles, Calif., a corporation of California Original application November 1, 1945, Serial No. 626,025, now Patent No. 2,492,126, dated December 20, 1949. Divided and this application December 21, 1949, Serial No. 134,327

1 Claim. (Cl. 280—104.5)

This invention relates to suspension means for mounting the chassis framework of a vehicle upon the braked wheels thereof, particularly when such wheels are closely spaced at each side in tandem relationship.

The present invention is concerned with brake operating mechanisms and means for mounting them within the suspension, especially where the suspension embodies a relatively rigid arm of substantially invariable length or a relatively rigid walking beam carrying stub axles.

The subject matter of this application is divided out of my copending application, Serial Number 626,025, filed November 1, 1945, now Patent No. 2,492,126, granted December 20, 1949.

It is the primary object of this invention to devise a novel and useful combination of a suspension arm and operating mechanism for the brake of a wheel that supports the arm.

Another important object of the present invention is to provide an improved brake actuating mechanism operable from power means mounted directly upon a wheel suspension element.

A further object resides in the provision of a novel and useful spider mountable upon a stub axle and carrying elements operable to actuate the brake of a wheel carrying said stub axle.

The foregoing and other objects of the present invention should clearly appear from a study of the following detailed description when taken in conjunction with the accompanying drawing, wherein:

Fig. 1 is a top plan view, in partial section, of a preferred embodiment of the invention, brake actuating mechanism being shown only at one end of the beam;

Fig. 2 is an end view, likewise in partial section; and

Fig. 3 represents a side elevational view of the same device with power units and linkages added.

With continued reference to the drawing, there is shown a rigid, hollow walking beam 5 having integral offset ends 6, between which there is a hub 7 dividing it into a pair of sloping arms and designed to be pivotally received by a shaft or sleeve member for support of a vehicle chassis. Normally this member (not completely shown) will take the form of a jack-shaft assembly 11 mounted transversely of the chassis in unsprung relation thereto.

Stub axles 8 have enlarged portions 9 set securely into sockets in the beam ends 6, and between their ends these axles have surfaces 12 for a special purpose presently to be made apparent.

In order to render the beam more sturdy and to afford better support for the jack-shaft assembly, a plate 13 may be welded to the bottom of the beam below the hub 7 to provide a platform that extends towards the vehicle center line; and this plate may be reenforced by two further plates 14 alongside thereof and likewise preferably secured in position by welding. To the extended end of the platform there is bolted or otherwise secured the base of a sleeve member 15 so that the bearing portion thereof is aligned with the hub 7.

To each plate 14 (or in the absence thereof, directly to the beam) there is rigidly secured a bracket 16, and to the inner or opposed faces of the brackets there is secured a pair of conventional power units 17 for the purpose of actuating the brakes of the wheels to be mounted on the axles 8. The units 17 have suitable connections (not shown) to a power source on the vehicle. Each power unit linearly actuates a rod 18 that extends towards an end of the beam into pivotal interconnection with the lower end of a lever 19 just below one of the stub axles.

The upper end of each lever 19 is screwed into a socket 20 that is affixed, by key or otherwise, to one end of a shaft 21. The latter is journaled through a lug 22 welded to the walking beam and thence through one eye 24 of a spider 23, the hub 25 of which is tightly fitted upon the appropriate stub axle surface 12. The spider has two further integral eyes 26 to which the proximate ends of a pair of brake shoes (conventional and not shown) may be pivotally connected. The other ends of the shoes are intended to be separated in known manner by an S-shaped cam C when braking power is supplied to the motors 17.

It will be seen that the disclosed structure is compact and so arranged as to require space not otherwise usable, and that it affords facile and very accurate brake operation.

Obviously, some changes in design may be made within the scope of the invention, also that the actuating mechanism might be applied to a single suspension arm pivotally connected at one end to the vehicle frame. Therefore, I wish to be limited in customary manner only a reasonably liberal interpretation of the appended claim.

What is claimed is:

In combination with a rigid walking beam having a central pivotal hub integral with a pair of downwardly sloping arms, and a stub axle rigidly carried by the end of each arm: a pair of individual brackets secured symmetrically to the bottom of said beam within the crotch formed by said sloping arms; a power motor mounted upon each bracket and approximately within said crotch; a spider mounted upon each stub axle to serve as an intermediate support for mechanism actuated by its associated motor; and an operating linkage connected between each motor and its associated mechanism.

GUSTAVE A. COLLENDER.

REFERENCES CITED

The following references are of record in the file of this patent:

UNITED STATES PATENTS

| Number | Name | Date |
|---|---|---|
| 1,887,042 | Rogers | Nov. 8, 1932 |
| 1,908,228 | Dotson | May 9, 1933 |
| 1,925,536 | Judd | Sept. 5, 1933 |
| 2,239,286 | Freitag | Apr. 22, 1941 |
| 2,311,252 | Reid | Feb. 16, 1943 |
| 2,343,872 | Low | Mar. 14, 1944 |
| 2,417,690 | Keller, Jr. | Mar. 18, 1947 |
| 2,459,372 | Fraunfelder | Jan. 18, 1949 |